US011695844B2

(12) United States Patent
Bartolomé Rodrigo et al.

(10) Patent No.: US 11,695,844 B2
(45) Date of Patent: Jul. 4, 2023

(54) RE-SELECTION OF A NETWORK FUNCTION INSTANCE BASED ON DATA CONSISTENCY

(71) Applicant: Telefonaktiebolaget LM Ericsson (publ), Stockholm (SE)

(72) Inventors: Maria Cruz Bartolomé Rodrigo, Madrid (ES); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 17/599,773

(22) PCT Filed: Mar. 16, 2020

(86) PCT No.: PCT/EP2020/057111
§ 371 (c)(1),
(2) Date: Sep. 29, 2021

(87) PCT Pub. No.: WO2020/200738
PCT Pub. Date: Oct. 8, 2020

(65) Prior Publication Data
US 2022/0174121 A1 Jun. 2, 2022

(30) Foreign Application Priority Data
Mar. 29, 2019 (EP) ..................... 19382228

(51) Int. Cl.
*H04L 67/51* (2022.01)
*H04L 67/52* (2022.01)
(Continued)

(52) U.S. Cl.
CPC ............ *H04L 67/51* (2022.05); *H04L 41/042* (2013.01); *H04L 67/52* (2022.05); *H04W 8/005* (2013.01); *H04W 48/18* (2013.01)

(58) Field of Classification Search
None
See application file for complete search history.

(56) References Cited

U.S. PATENT DOCUMENTS 7,778,965 B2 * 8/2010 Bindewald .......... G06F 16/2365
707/610
11,222,005 B1 * 1/2022 Wu ........................ G06F 16/27
(Continued)

FOREIGN PATENT DOCUMENTS

EP            3679707 A1 *  7/2020  ............. H04L 67/16
WO      2019219219 A1    11/2019
WO   WO-2020200597 A1 * 10/2020  ........ H04W 36/0033

OTHER PUBLICATIONS

3GPP, "3GPP TR 23.742 V16.0.0", 3rd Generation Partnership Project; Technical Specification Group Services and System Aspects; Study on Enhancements to the Service-Based Architecture (Release 16), Dec. 2018, 1-131.
(Continued)

*Primary Examiner* — Lashonda Jacobs-Burton
(74) *Attorney, Agent, or Firm* — Murphy, Bilak & Homiller, PLLC

(57) ABSTRACT

The present invention faces the issues of re-selection of another NF Service instance (103, 201) for a subsequent request (S-520, S-535) with a same data consistency (Consistency 1) as a previously selected NF Service instance (101). To solve this issue, the present invention provides for identifying at configuration, based on the deployment and on the Storage solution for the Session/context data, which instances (101, 103, 201) of the same service type have access with strong consistency to the same data, and provide this information to the consumer (40), so it is allowed to prioritize selection of an alternative NF service instance that supports strong consistency, whenever possible.

20 Claims, 6 Drawing Sheets

(51) Int. Cl.
*H04W 8/00* (2009.01)
*H04L 41/042* (2022.01)
*H04W 48/18* (2009.01)

(56) References Cited

U.S. PATENT DOCUMENTS

| | | | |
|---|---|---|---|
| 11,509,717 B2* | 11/2022 | Gupta | G06F 16/2365 |
| 2004/0122927 A1* | 6/2004 | Muehl | H04L 67/51 |
| | | | 709/223 |
| 2005/0276229 A1* | 12/2005 | Torabi | H04L 67/51 |
| | | | 370/252 |
| 2009/0210455 A1* | 8/2009 | Sarkar | G06F 11/2038 |
| 2011/0051622 A1* | 3/2011 | Bosneag | H04L 41/12 |
| | | | 370/254 |
| 2018/0145923 A1* | 5/2018 | Chen | H04L 47/70 |
| 2020/0314615 A1* | 10/2020 | Patil | H04W 48/18 |
| 2021/0144206 A1* | 5/2021 | Gupta | H04L 67/1097 |
| 2021/0274392 A1* | 9/2021 | Dao | H04W 36/18 |
| 2022/0021731 A1* | 1/2022 | Bartolomé Rodrigo | |
| | | | H04L 67/63 |
| 2022/0109633 A1* | 4/2022 | Li | H04L 67/51 |

OTHER PUBLICATIONS

3GPP, "3GPP TR 28.801 V15.1.0", 3rd Generation Partnership Project; Technical Specification Group Services and System Aspects; Telecommunication management; Study on management and orchestration of network slicing for next generation network (Release 15), Jan. 2018, 1-75.

3GPP, "3GPP TS 23.502 V15.5.0", 3rd Generation Partnership Project; Technical Specification Group Services and System Aspects; Procedures for the 5G System; Stage 2 (Release 15), Mar. 2019, 1-355.

3GPP, "3GPP TS 29.510 V15.3.0", 3rd Generation Partnership Project; Technical Specification Group Core Network and Terminals; 5G System; Network Function Repository Services; Stage 3 (Release 15), Mar. 2019, 1-121.

3GPP, "3rd Generation Partnership Project; Technical Specification Group Services and System Aspects; Study on Enhancements to the Service-Based Architecture (Release 16)", 3GPP TR 23.742 V1.0.0, Sep. 2018, 1-101.

NTT Docomo, "Update and evaluation of the Service Instance Set Solution 11", SA WG2 Meeting #129, S2-1810729, Dongguan, P. R. China, Oct. 15-19, 2018, 1-5.

3GPP, "3rd Generation Partnership Project; Technical Specification Group Services and System Aspects; System Architecture for the 5G System; Stage 2 (Release 15)", 3GPP TS 23.501 V15.5.0, Mar. 2019, pp. 1-241.

* cited by examiner

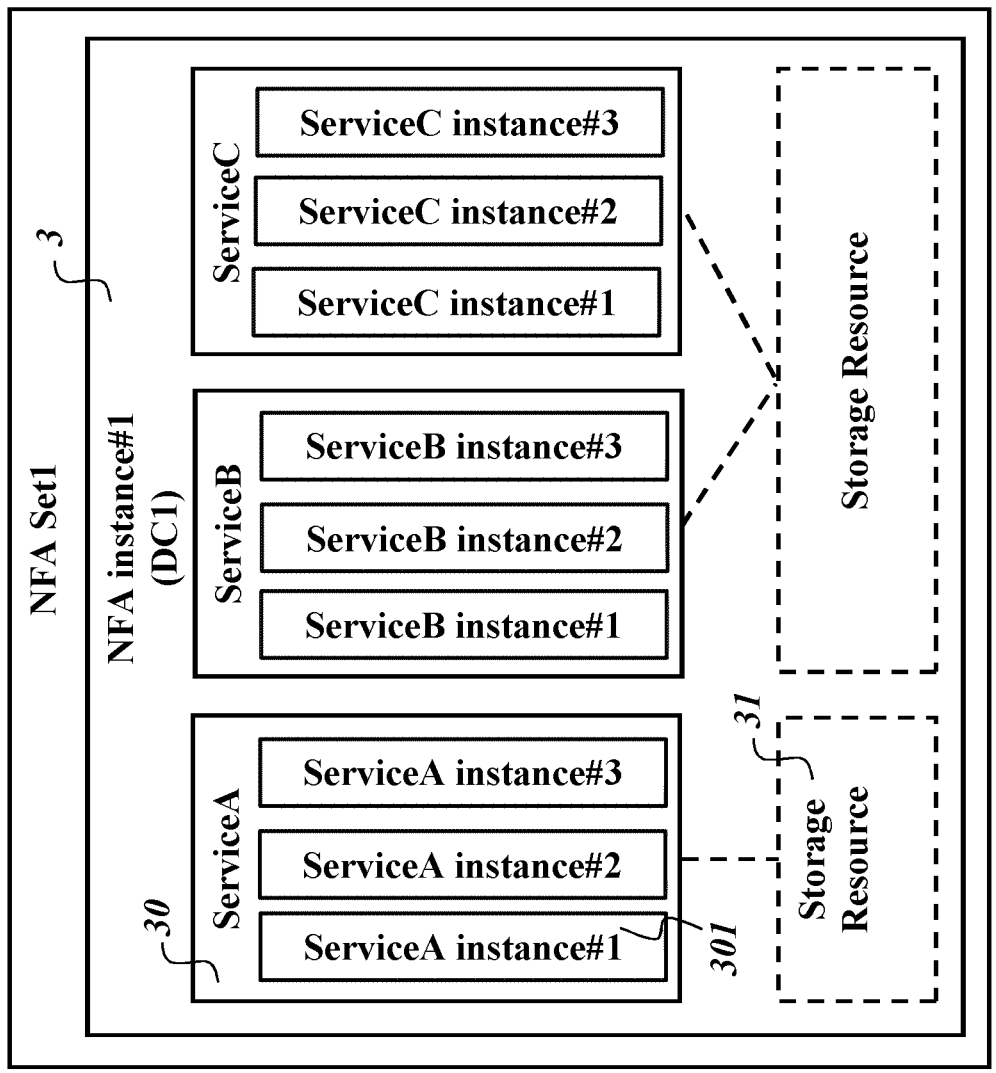
FIG. -1-

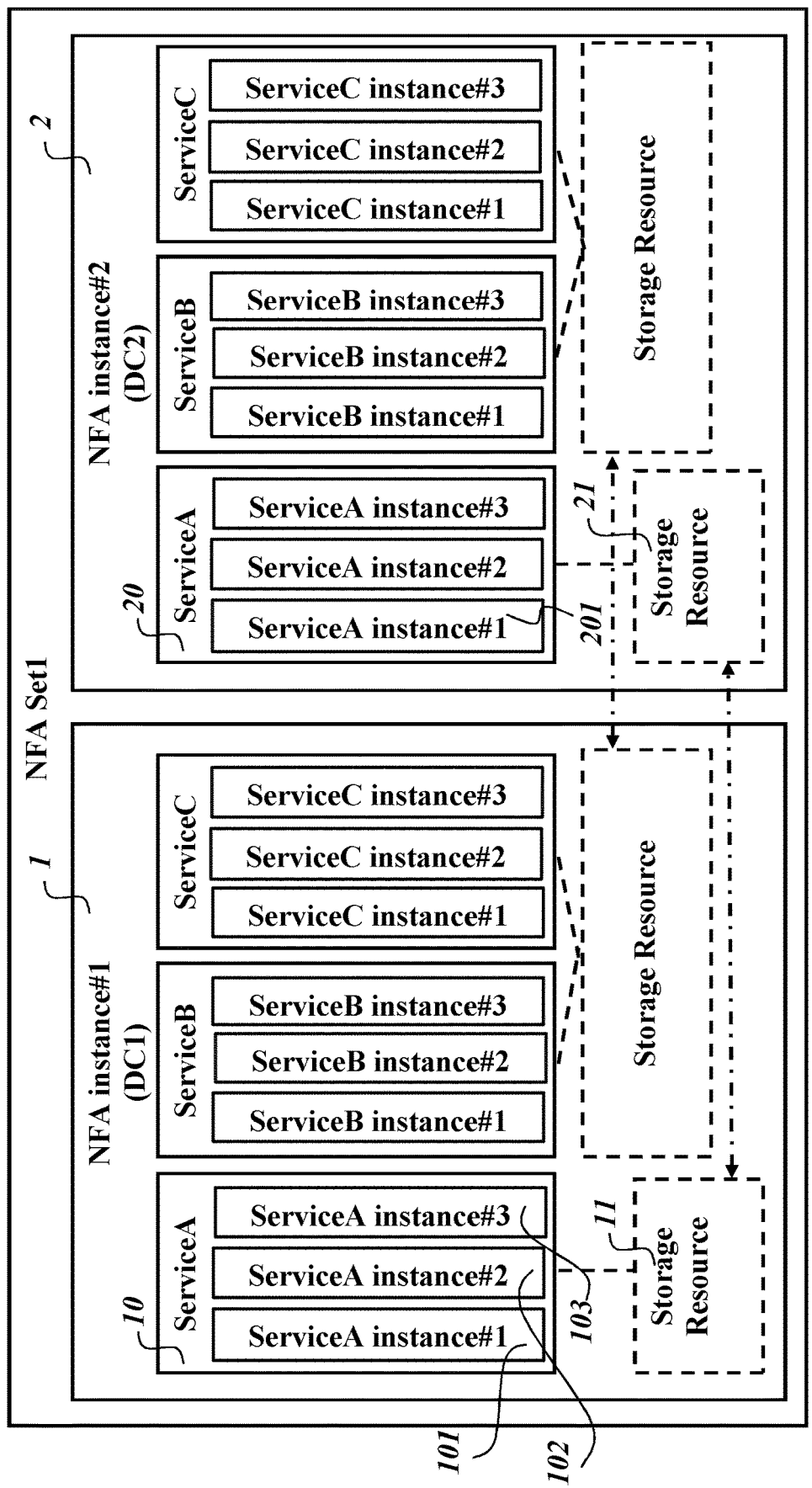
FIG. -2-

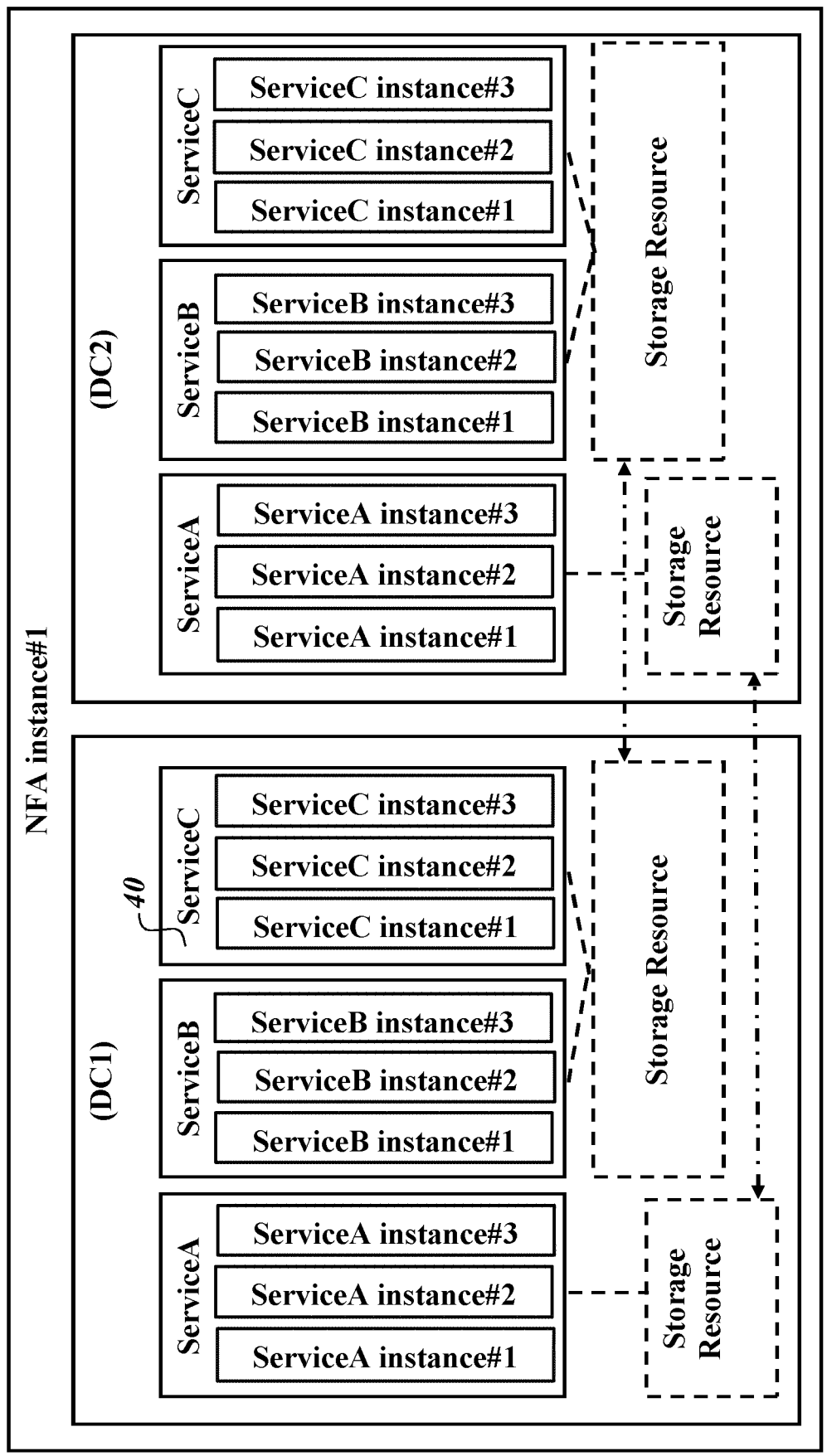
FIG. -3-

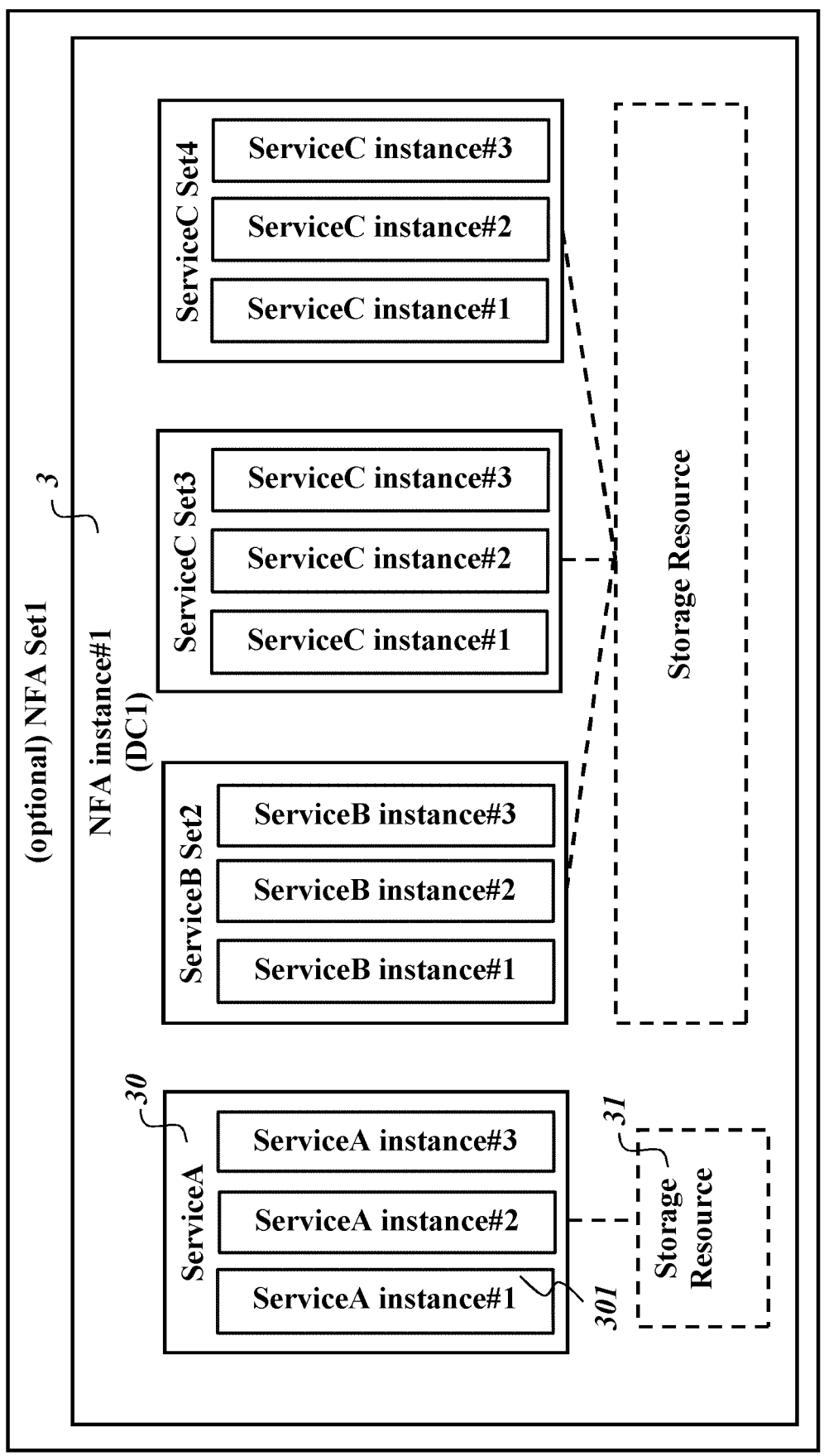
FIG. -4-

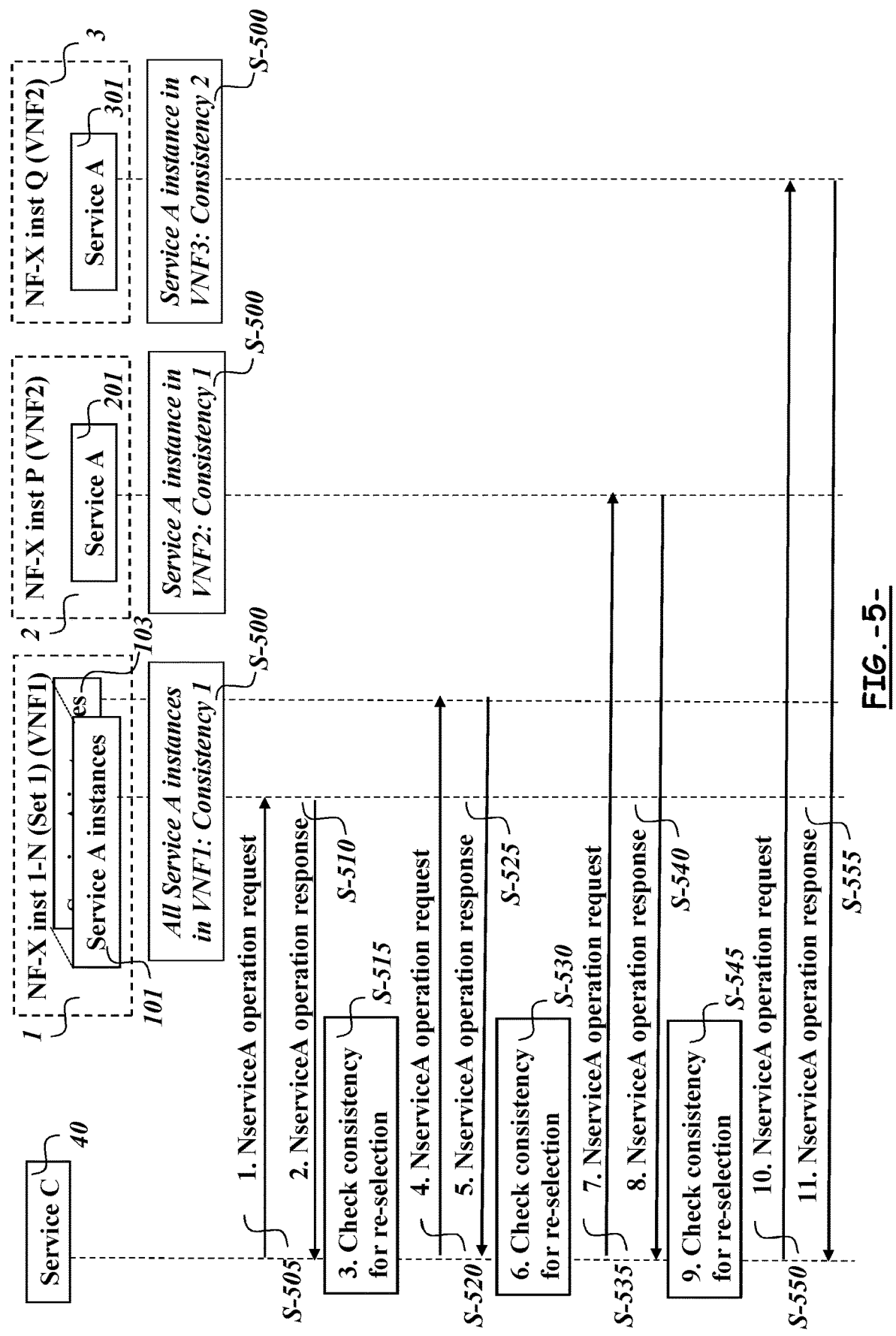
FIG. -5-

| Service Instance | Service | NF instance | Consistency Indicator |
|---|---|---|---|
| ServiceA instance#1 | A | VNF1 | 1 |
| ... | A | VNF1 | 1 |
| ServiceA instance#N | A | VNF1 | 1 |
| ServiceA instance#P | A | VNF2 | 1 |
| ServiceA instance#Q | A | VNF3 | 2 |

FIG. -6-

RE-SELECTION OF A NETWORK FUNCTION INSTANCE BASED ON DATA CONSISTENCY

TECHNICAL FIELD

The present invention generally relates to selection of a Network Function, NF, instance in a 5G network; and, more specifically, the invention relates to selection of an NF instance based on data consistency to optimize producer interchangeability.

BACKGROUND

The next generation (5G) networks architecture is defined in 3GPP TS 23.501 V15.5.0 and 3GPP TS 23.502 V15.5.0. A key aspect in which the 3GPP networks will differ starting from Release 15 is that the Core Network (CN) architecture is mostly built around the Service Based Architecture (SBA) paradigm. That is, there will be a network domain, basically the CN, in which the different functional components are defined as Services, which are self-contained functionalities that can be changed and modified in an isolated manner, without affecting the others.

The services in 5G CN will likely be built in a stateless way, i.e., the business logic and data context will be separated. This means that the services store their context externally in a proprietary DB. This will enable various cloud infrastructure features like auto-scaling or auto-healing.

3GPP TS 23.501 defines a Network Function (NF) as a 3GPP adopted or 3GPP defined processing function in a 5G network, which has defined functional behaviour and 3GPP defined interfaces. In particular, 3GPP TS 23.501 discloses in section 5.21 that NFs may be deployed in a virtualized environment. Apart from that, services will be deployed as part of a NF, and multiple NF instances may be deployed in a Set as disclosed in 3GPP TS 23.742 V16.0.0, as long as these instances have access to the same context data.

In this respect, 3GPP TS 29.510 V15.3.0 discloses an NF Repository Function (NRF) as a network entity in the 5G Core Network (5GC) supporting the following functionality: maintains the NF profile of available NF instances and their supported services; and supports service discovery function. It receives NF Discovery Requests from NF instances, and provides the information of the available NF instances fulfilling certain criteria (e.g., supporting a given service). To this end, the NFRegister service operation is used: to register an NF in the NRF by providing the NF profile of the requesting NF to the NRF, and the NRF marks the requesting NF as available to be discovered by other NFs; and to register services associated to an existing NF Instance. Moreover, the NFDiscover service operation discovers the set of NF Instances (and their associated NF Service Instances), represented by their NF Profile, that are currently registered in NRF and satisfy a number of input query parameters.

As illustrated in FIG. 1, one NF instance will be always supplied by a single vendor, including multiple services (as standardized by 3GPP). Each service may be instantiated in a pool and have access to a storage resource that may be shared by other services in the NF instance, but this is up to implementation and deployment, not standardized by 3GPP.

As illustrated in FIG. 2, one or multiple NF instances, in a same or different Data Center (DC), may be deployed in a same NF Set, what means that those instances provide the same business logic and have access to the same data. The access to the same data may be by different means, providing different levels of data consistency, e.g. if replication is required among locally deployed storage resources, this replication may be synchronous or asynchronous.

In order to have access to the same data, being this data not standardized, all the NF instances in an NF Set are by same vendor.

It could be possible as well that an NF instance spans multiple DCs as exemplary illustrated in FIG. 3.

Currently, there is an ongoing discussion in 3GPP that may consider the Service Set concept as well as a standard construct illustrated in FIG. 4. The main difference with FIG. 1 above is that in FIG. 4, the Service Set construct is standardized, while in FIG. 1 the internal pool of instances is managed internally to the NF instance.

As disclosed above, one or multiple NF instances, in a same or different DC (Data Center), may be deployed in the same NF Set, what means that those instances provide the same business logic and have access to the same data. The access to the same data may be by different means, providing different levels of data consistency, e.g. if replication is required among locally deployed storage resources, this replication may be synchronous or asynchronous.

There are two consistency models: weak and strong. If the technology/method used/implemented to access to the "same" data does not ensure strong consistency, this implies that different parallel processes can perceive variables in different states. In our case, this means that access to the "shared" data in two different NF instances may not have access to exactly the same data (the most up to date).

However, 3GPP TS 23.502 provides a definition of the NF Set as follows. NF Set: A group of interchangeable NF instances of the same type, supporting the same services and the same Network Slice(s). The NF instances in the same NF Set may be geographically distributed but have access to the same context data.

Apparently, the NF instances are "interchangeable", to be understood as that a consumer could use any of them and get the same results, as it is described in another paragraph for re-selection.

The standard also discloses: If the end point address provided by a NF service producer points to a specific target NF producer, or NF service producer, instance within a NF Set, the NF consumer or SCP may re-select another service instance of the same NF service within the same NF service Set in that same NF instance, or another NF instance in the same NF Set for subsequent transaction, and get the same results as if the original selected NF service instance was used. Re-selecting may be needed if the requester NF fails to contact the original NF service instance.

This disclosure seems to consider that in case of re-selection of another NF Service instance for a subsequent request, the results will be the same as if the former NF Service instance was selected, even regardless whether the NF Set is distributed geographically.

However, this is only true if strong consistency could be ensured in the access to that shared data, what is not always the case, it depends on the consistency model supported by the DB technology.

Moreover, if the NF instances within an NF Set are distributed geographically, the distances among then could be high, in those cases, the possibility to access to different data "states" in different NF instances increases.

SUMMARY

The present invention is aimed to overcome these drawbacks and provides for a solution in accordance with the appended claims. That is, sending additional information to the Consumers and enhancing the Consumer logic so that the Consumers re-select another NF in an NF Set in a more optimal way. For example, the NF/service instances (of same type) within a Set that support strong consistency would be preferred to be selected by the consumer (or SCP) instead of NF/service instances that cannot provide data consistency, and by this it is warrantied that the consumer gets the same results.

For this, each producer service instance is provisioned in a way that enables the Consumer logic re-selecting a service instance that has strong consistency with the previous instance.

An advantage is that this proposal allows the consumer/SCP to prioritize selection of an alternative NF/service instance that supports strong consistency. If not possible, the consumer/SCP may select another NF/service instance, but the result may not be exactly the same (as if not reselected), then the consumer/SCP may even consider not reselecting in those cases (unless the former producer instance fails).

Another advantage is that some business logic (by a consumer) may only be supported as long as strong consistency is ensured; in those cases, this invention allows the consumer not re-selecting. This may be relevant to avoid corrupting data in some cases, if the consumer continues modifying data that was not fully consistent.

On the other hand, the invention may be practised by a computer program, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 represents a basic and exemplary construction of an NF instance.

FIG. 2 represents a basic and exemplary construction of an NF set with more than one NF instance.

FIG. 3 illustrates an NF instance spanning multiple DCs.

FIG. 4 represents a basic and exemplary construction of a service set with an NF instance.

FIG. 5 illustrates an exemplary sequence of actions carried out in a Consumer re-selection based on a consistency value of the producer instance, in accordance with an embodiment.

FIG. 6 illustrates an extract of FIG. 5 compiling data shown in step S-500 for VNF1 1, VNF2 2 and VNF3 3.

DETAILED DESCRIPTION

The following describes currently preferred embodiments wherein each service instance within an NF Set is identified with a new attribute, e.g. Consistency, that identifies whether this service instance has strong consistency with another instance, by having the same attribute value.

For the sake of simplicity and clarity, the following embodiment refers to an exemplary service type X instance 1, as illustrated in FIG. 5.

The sequence of actions illustrated in FIG. 5 assume an initial configuration not illustrated and discussed in the following.

There are three different virtualized NFs, VNFs, each one including a local Session DB, unique for the instances in the same VNF. In this respect, 3GPP TR 28.801 V15.1.0 (2018-01) defines a Network Function (NF): Network Function refers to processing functions in a network, wherein VNF is a virtualized version of a NF (refer to ETSI NFV for further details on VNF).

VNF1 includes multiple Service A instances that have access to the same data in the Storage Resource. Then, strong consistency is ensured, and then all the instances are configured with the same Consistency value, e.g. Consistency 1.

VNF2 includes only one Service A instance that has access to another local Storage Resource. This local resource is synchronously replicated with Storage resource in VNF1. That is, strong consistency is ensured. Then, it has same consistency value, e.g. Consistency 1.

VNF3 includes only one Service A instance that has access to another local Storage Resource. This local resource is asynchronously replicated with rest of Storage resources in the example.

All service A instances are published externally as SBA services. Now, the sequence of actions illustrated in FIG. 5 are discussed in the following.

Action 1. Consumer service C sends an operation request to Service A (in VNF1), selected based on the information received at discovery, discussed above with reference to 3GPP TS 29.510 V15.3.0. It may even be randomly. As an alternative, the initial selection could consider for the selection of a service instance whether there are other instances with strong consistency with this one, these ones will be preferred, since re-selection will ensure that same result is achieved.

Action 2. Response from Service A.

Action 3. Consumer C performs re-selection with each request (what seems be considered by some operators as a possibility). Then, it checks what other Service A instance could be selected to ensure same results.

Action 4. All the service A instances with same Consistency 1 value ensure strong consistency, then in this case, consumer C chooses another service A instance in VNF1.

Action 5. Response from Service A.

Action 6. Consumer C performs re-selection, it checks what other Service A instance could be selected to ensure same results.

Action 7. All the service A instances with same Consistency 1 value ensure strong consistency, then in this case, consumer C chooses service A instance in VNF2.

Action 8. Response from Service A.

Action 9. Consumer C performs re-selection, it checks what other Service A instance could be selected to ensure same results. Let us assume in this example, VNF1 and VNF2 are down. Then, the consumer will select another instance of Service A, but it may not get the same results.

Action 10. Consumer C chooses service A instance in VNF3, with another consistency value, what indicates strong consistency can't be ensured.

Action 11. Response from Service A.

In the following there is disclosed another alternative on how to achieve the current proposal. It assumes that the data consistency information is embedded into an existing attribute that is available in the NF profile, say, the Locality information.

The Locality describes the location of NF instance (e.g. geographic location, data center), but it could be extended to optionally include also information about data consistency. An example is given below. Let us assume that there are three NFs in a DC but only two of them are interchangeable in a way that allows full data consistency, NF1 and NF2, while NF3 is not interchangeable with the other two in the same way. The Location attributes could then be defined such that NF3, which would not provide strong data consistency if re-selected after NF1 and NF2, is configured with a different Locality parameter, for example any one of: i) NF1 in DC1: Locality: DC1.C1; ii) NF2 in DC1: Locality: DC1.C1; and NF3 in DC1: Locality: DC1.C2.

If the Consumers are provisioned such that to prioritize the re-selection of the NF with the same Location attribute, then strong data consistency is favoured by using the existing NF/service registration and discovery mechanisms, which are discussed above with reference to 3GPP TS 29.510 V15.3.0.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for selection and reselection of a service instance in a network function (NF) instance based on data consistency, the method performed by a network node that implements a service consumer or a service consumer proxy (SCP), the method comprising:
    discovering, by the network node, two or more NF instances that include a first NF instance and a second NF instance, wherein the first NF instance comprises a plurality of service instances for a service, and wherein the second NF instance comprises one or more service instances for the service;
    initially selecting, by the network node, a service instance from which to consume the service to be one of the service instances in the first NF instance;
    transmitting, by the network node towards the initially selected service instance, a service request requesting to consume the service from the initially selected service instance;
    determining, at the network node, that the network node must reselect the service instance from which to consume the service;
    obtaining consistency indicators respectively associated with candidate service instances that are candidates for the network node to reselect as the service instance from which to consume the service, wherein the candidate service instances include one or more other service instances in the first NF instance other than the initially selected service instance and further include the one or more service instances in the second NF instance;
    determining, for each of the candidate service instances, a level of data consistency provided by the candidate service instance indicating how consistent data at the candidate service instance is with data at the initially selected service instance, by comparing the consistency indicator associated with the candidate service instance with a consistency indicator associated with the initially selected service instance;
    based on the levels of data consistency respectively provided by the candidate service instances, reselecting the service instance from which to consume the service to be one of the candidate service instances, with a preference for selecting a candidate service instance that provides relatively stronger data consistency over selecting a candidate service instance that provides relatively weaker data consistency; and
    transmitting, by the network node towards the reselected service instance, another service request requesting to consume the service from the reselected service instance.

2. The method of claim 1, wherein determining, for each of the candidate service instances, a level of data consistency provided by the candidate service instance comprises determining, for each of the candidate service instances, the level of data consistency provided by the candidate service instance to be:
    a first level of data consistency if the consistency indicator associated with the candidate service instance matches the consistency indicator associated with the initially selected service instance; or
    a second level of data consistency if the consistency indicator associated with the candidate service instance does not match the consistency indicator associated with the initially selected service instance;
    wherein the first level of data consistency is higher than the second level of data consistency;
wherein said reselecting is performed with a preference for selecting a candidate service instance that provides the first level of data consistency over selecting a candidate service instance that provides the second level of data consistency.

3. The method of claim 1, wherein, for each of multiple services instances that include the initially selected service instance and the candidate services instances, the service instance is configured with access to a storage resource and the consistency indicator associated with the service instance:
    matches the consistency indicator associated with any other service instance that is configured with access to the storage resource or with access to another storage resource that is synchronously replicated with the storage resource; and
    does not match the consistency indicator associated with any other service instance that is not configured with access to the storage resource and is not configured with access to another storage resource that is synchronously replicated with the storage resource.

4. The method of claim 1, wherein, for each of multiple services instances that include the initially selected service instance and the candidate services instances, the consistency indicator associated with the service instance is obtained from an NF profile associated with the service instance.

5. The method of claim 4, wherein, for each of the multiple services instances, the NF profile associated with the service instance includes a consistency attribute indicating the consistency indicator associated with the service instance.

6. The method of claim 4, wherein, for each of the multiple services instances, the NF profile associated with the service instance includes a location attribute indicating the consistency indicator associated with the service instance.

7. The method of claim 6, wherein, for each of the multiple service instances, the service instance is configured with access to a storage resource and the location attribute included in the NF profile associated with the service instance:
    matches the location attribute included in the NF profile associated with any other service instance that has the same location and that is configured either with access to the storage resource or with access to another storage resource that is synchronously replicated with the storage resource; and does not match the location attribute included in the NF profile associated with any other service instance that:
has a different location; or
is not configured with access to the storage resource and is not configured with access to another storage resource that is synchronously replicated with the storage resource.

8. The method of claim 1, wherein said reselecting is performed with a requirement to select a candidate service instance that provides a highest level of data consistency.

9. A network node comprising:
a processor; and
memory comprising instructions which, when executed by the processor, enable the network node to implement service consumer or a service consumer proxy (SCP), whereby the network node is configured to:
discover two or more NF instances that include a first NF instance and a second NF instance, wherein the first NF instance comprises a plurality of service instances for a service, and wherein the second NF instance comprises one or more service instances for the service;
initially select a service instance from which to consume the service to be one of the service instances in the first NF instance;
transmit, towards the initially selected service instance, a service request requesting to consume the service from the initially selected service instance;
determine that the network node must reselect the service instance from which to consume the service;
obtain consistency indicators respectively associated with candidate service instances that are candidates for the network node to reselect as the service instance from which to consume the service, wherein the candidate service instances include one or more other service instances in the first NF instance other than the initially selected service instance and further include the one or more service instances in the second NF instance;
determine for each of the candidate service instances, a level of data consistency provided by the candidate service instance indicating how consistent data at the candidate service instance is with data at the initially selected service instance, by comparing the consistency indicator associated with the candidate service instance with a consistency indicator associated with the initially selected service instance;
based on the levels of data consistency respectively provided by the candidate service instances, reselecting the service instance from which to consume the service to be one of the candidate service instances, with a preference for selecting a candidate service instance that provides relatively stronger data consistency over selecting a candidate service instance that provides relatively weaker data consistency; and
transmit, towards the reselected service instance, another service request requesting to consume the service from the reselected service instance.

10. The network node of claim 9, wherein the memory comprises instructions which, when executed by the processor, enable the network node to determine, for each of the candidate service instances, the level of data consistency provided by the candidate service instance to be:

a first level of data consistency if the consistency indicator associated with the candidate service instance matches the consistency indicator associated with the initially selected service instance; or
a second level of data consistency if the consistency indicator associated with the candidate service instance does not match the consistency indicator associated with the initially selected service instance;
wherein the first level of data consistency is higher than the second level of data consistency;
wherein the memory comprises instructions which, when executed by the processor, enable the network node to reselect the service instance from which to consume the service, with a preference for selecting a candidate service instance that provides the first level of data consistency over selecting a candidate service instance that provides the second level of data consistency.

11. The network node of claim 9, wherein, for each of multiple services instances that include the initially selected service instance and the candidate services instances, the service instance is configured with access to a storage resource and the consistency indicator associated with the service instance:
matches the consistency indicator associated with any other service instance that is configured with access to the storage resource or with access to another storage resource that is synchronously replicated with the storage resource; and
does not match the consistency indicator associated with any other service instance that is not configured with access to the storage resource and is not configured with access to another storage resource that is synchronously replicated with the storage resource.

12. The network node of claim 9, wherein, for each of multiple services instances that include the initially selected service instance and the candidate services instances, the consistency indicator associated with the service instance is obtained from an NF profile associated with the service instance.

13. The network node of claim 12, wherein, for each of the multiple services instances, the NF profile associated with the service instance includes a consistency attribute indicating the consistency indicator associated with the service instance.

14. The network node of claim 12, wherein, for each of the multiple services instances, the NF profile associated with the service instance includes a location attribute indicating the consistency indicator associated with the service instance.

15. The network node of claim 14, wherein, for each of the multiple service instances, the service instance is configured with access to a storage resource and the location attribute included in the NF profile associated with the service instance:
matches the location attribute included in the NF profile associated with any other service instance that has the same location and that is configured either with access to the storage resource or with access to another storage resource that is synchronously replicated with the storage resource; and
does not match the location attribute included in the NF profile associated with any other service instance that:
has a different location; or
is not configured with access to the storage resource and is not configured with access to another storage resource that is synchronously replicated with the storage resource.

16. The network node of claim 9, wherein the memory comprises instructions which, when executed by the processor, enable the network node to reselect the service instance from which to consume the service with a requirement to select a candidate service instance that provides a highest level of data consistency.

17. A system for selection and reselection of a service instance in a network function (NF) instance based on data consistency, the system comprising:
two or more NF instances that include a first NF instance and a second NF instance, wherein the first NF instance comprises a plurality of service instances for a service, and wherein the second NF instance comprises one or more service instances for the service;
a network node comprising a processor and memory, the memory comprising instructions which, when executed by the processor, enable the network node to implement a service consumer or a service consumer proxy (SCP) whereby the network node is configured to:
discover two or more NF instances that include a first NF instance and a second NF instance, wherein the first NF instance comprises a plurality of service instances for a service, and wherein the second NF instance comprises one or more service instances for the service;
initially select a service instance from which to consume the service to be one of the service instances in the first NF instance;
transmit, towards the initially selected service instance, a service request requesting to consume the service from the initially selected service instance;
determine that the network node must reselect the service instance from which to consume the service;
obtain consistency indicators respectively associated with candidate service instances that are candidates for the network node to reselect as the service instance from which to consume the service, wherein the candidate service instances include one or more other service instances in the first NF instance other than the initially selected service instance and further include the one or more service instances in the second NF instance;
determine, for each of the candidate service instances, a level of data consistency provided by the candidate service instance indicating how consistent data at the candidate service instance is with data at the initially selected service instance, by comparing the consistency indicator associated with the candidate service instance with a consistency indicator associated with the initially selected service instance;
based on the levels of data consistency respectively provided by the candidate service instances, reselecting the service instance from which to consume the service to be one of the candidate service instances, with a preference for selecting a candidate service instance that provides relatively stronger data consistency over selecting a candidate service instance that provides relatively weaker data consistency; and
transmitting, by the network node towards the reselected service instance, another service request requesting to consume the service from the reselected service instance.

18. The system of claim 17, wherein the memory comprises instructions which, when executed by the processor, enable the network node to determine, for each of the candidate service instances, the level of data consistency provided by the candidate service instance to be:
a first level of data consistency if the consistency indicator associated with the candidate service instance matches the consistency indicator associated with the initially selected service instance; or
a second level of data consistency if the consistency indicator associated with the candidate service instance does not match the consistency indicator associated with the initially selected service instance;
wherein the first level of data consistency is higher than the second level of data consistency;
wherein the memory comprises instructions which, when executed by the processor, enable the network node to reselect the service instance from which to consume the service, with a preference for selecting a candidate service instance that provides the first level of data consistency over selecting a candidate service instance that provides the second level of data consistency.

19. The system of claim 17, wherein, for each of multiple services instances that include the initially selected service instance and the candidate services instances, the service instance is configured with access to a storage resource and the consistency indicator associated with the service instance:
matches the consistency indicator associated with any other service instance that is configured with access to the storage resource or with access to another storage resource that is synchronously replicated with the storage resource; and
does not match the consistency indicator associated with any other service instance that is not configured with access to the storage resource and is not configured with access to another storage resource that is synchronously replicated with the storage resource.

20. The system of claim 17, wherein, for each of multiple services instances that include the initially selected service instance and the candidate services instances, the consistency indicator associated with the service instance is obtained from an NF profile associated with the service instance.

* * * * *